(12) United States Patent
Walton et al.

(10) Patent No.: US 8,836,717 B2
(45) Date of Patent: Sep. 16, 2014

(54) SYSTEM, METHOD AND UTILITY TO FORMAT IMAGES RETRIEVED FROM A DEVICE

(75) Inventors: Andrew Christopher Walton, Rocklin, CA (US); Bryan J. Jacquot, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2315 days.

(21) Appl. No.: 11/260,967

(22) Filed: Oct. 27, 2005

(65) Prior Publication Data
US 2007/0097397 A1    May 3, 2007

(51) Int. Cl.
*G09G 5/00* (2006.01)

(52) U.S. Cl.
USPC .............................. 345/619; 345/581; 345/625

(58) Field of Classification Search
None
See application file for complete search history.

(56) References Cited

U.S. PATENT DOCUMENTS

| | | | |
|---|---|---|---|
| 5,727,135 A | 3/1998 | Webb et al. | |
| 6,550,055 B1 * | 4/2003 | Cohen et al. | 717/124 |
| 6,771,288 B2 * | 8/2004 | Boulter | 715/736 |
| 2001/0011294 A1 * | 8/2001 | Ellis, III | 709/201 |
| 2003/0090459 A1 | 5/2003 | Lapstun et al. | |
| 2003/0154266 A1 | 8/2003 | Bobick et al. | |
| 2004/0030778 A1 | 2/2004 | Kronenberg et al. | |
| 2004/0083138 A1 | 4/2004 | Silverbrook et al. | |
| 2004/0093559 A1 | 5/2004 | Amaru et al. | |
| 2004/0104928 A1 | 6/2004 | Morioka | |
| 2005/0262268 A1 * | 11/2005 | Furukawa et al. | 709/245 |

FOREIGN PATENT DOCUMENTS

| | | |
|---|---|---|
| EP | 0444251 A | 9/1991 |
| EP | 08058026 A1 | 6/1992 |
| EP | 05757168 A | 6/1993 |
| EP | 0640905 | 3/1995 |
| EP | 1531580 | 5/2005 |
| JP | 2001-075756 A | 3/2001 |
| JP | 2001-356890 A | 12/2001 |
| JP | 2003-242056 A | 8/2003 |
| WO | 94/11804 A | 5/1994 |

* cited by examiner

Primary Examiner — Jwalant Amin

(57) ABSTRACT

In one embodiment, an image formatting utility is embodied in code, stored and executed apart from any device that it retrieves images from, that, in response to receiving an image request from a device management tool: 1) retrieves an image from a device that is a target of the image request, the image illustrating at least a portion of the device; 2) retrieves component presence and status information for the device; 3) formats the image in response to the component presence and status information; and 4) returns the formatted image to the device management tool. Other embodiments are also disclosed.

19 Claims, 3 Drawing Sheets

US 8,836,717 B2

SYSTEM, METHOD AND UTILITY TO FORMAT IMAGES RETRIEVED FROM A DEVICE

BACKGROUND

The management of a device is typically aided by providing its user with a means to graphically visualize the device. In some cases, one or more images of a device and its components may be included within paper or electronic documentation (e.g., a user manual). In other cases, a device may be provided with stickers showing one or more views of the device's interior components.

In still other cases, images of a device may be incorporated into a management tool for the device. For example, a print driver may display an image of the printer to which it corresponds, or a server management tool may display various images associated with the server components of which the management tool is aware or can manage (e.g., the server's memory modules, interfaces, or storage disks).

Many devices for which graphical images are needed are subject to change. That is, the devices may be upgradeable such that additional components (e.g., memory modules, interfaces, or storage disks) may be inserted into or attached to the device. Thus, an issue facing the image creator is whether to draw an image of each configuration of the device or draw a single "exemplary" image in which the device is depicted in one particular "default" configuration.

A device may also be subject to change over its lifecycle. That is, the styling of the device's exterior, the suppliers of its internal components, its "default" configuration, and even its available features can change over its lifecycle. Thus, any images pertaining to the first generation of the device may not accurately depict later generations of the device.

As one can appreciate, the creation and maintenance of graphical images for a device can present a significant burden for both device manufacturers and third-party device supporters (e.g., management tool developers).

SUMMARY OF THE INVENTION

In one embodiment, an image formatting utility comprises code, stored and executed apart from any device that it retrieves images from, to, in response to receiving an image request from a device management tool: 1) retrieve an image from a device that is a target of the image request, the image illustrating at least a portion of the device; 2) retrieve component presence and status information for the device; 3) format the image in response to the component presence and status information; and 4) return the formatted image to the device management tool.

In another embodiment, a computer-implemented method for formatting images of a device comprises, in response to receiving an image request from a device management tool, and apart from any device that the method retrieves images from: 1) retrieving an image from a device that is a target of the image request, the image illustrating at least a portion of the device; 2) retrieving component presence and status information for the device; 3) formatting the image in response to the component presence and status information; and 4) returning the formatted image to the device management tool.

In yet another embodiment, a system for displaying images of a device comprises a device having a non-volatile memory in which an image illustrating the device is stored. The system also comprises a device management tool and an image formatting utility. The image formatting utility is stored and executed apart from the device and may be configured as described in either of the preceding paragraphs so that it returns a formatted image to the device management tool.

Other embodiments are also disclosed.

BRIEF DESCRIPTION OF THE DRAWINGS

Illustrative embodiments of the invention are illustrated in the drawings, in which.

DETAILED DESCRIPTION

One development that has eased the burden of creating and maintaining graphical images for a device is the electronic storage of a device's images within the device itself. For example, different images pertaining to different portions, views and/or components of a device may be saved as Scalable Vector Graphics (SVG) images, or other easy-to-manipulate image types, and stored within a non-volatile memory of the device (preferably, but not always, in the device's firmware). Thus, a management tool for the device no longer needs to provide its own set of images for the device. Rather, the management tool need only be provided with abilities to 1) query the device to retrieve an image of the device, and 2) format the image to reflect the current state of the device. In this manner, the developer of the management tool need not be concerned with how the device looks, and can instead focus on how the device functions and is managed.

To further ease a management tool developer's burden of having to work with device images, an image formatting utility and system incorporating same are disclosed herein. By way of example, the "utility" may take the form of an application or browser plug-in that is embodied in computer-readable code stored on one or more computer-readable media. The computer-readable media may include, for example, any number or mixture of fixed or removable media (such as one or more fixed disks, random access memories (RAMs), read-only memories (ROMs), or compact discs), at either a single location or distributed over a network.

Figure 1:
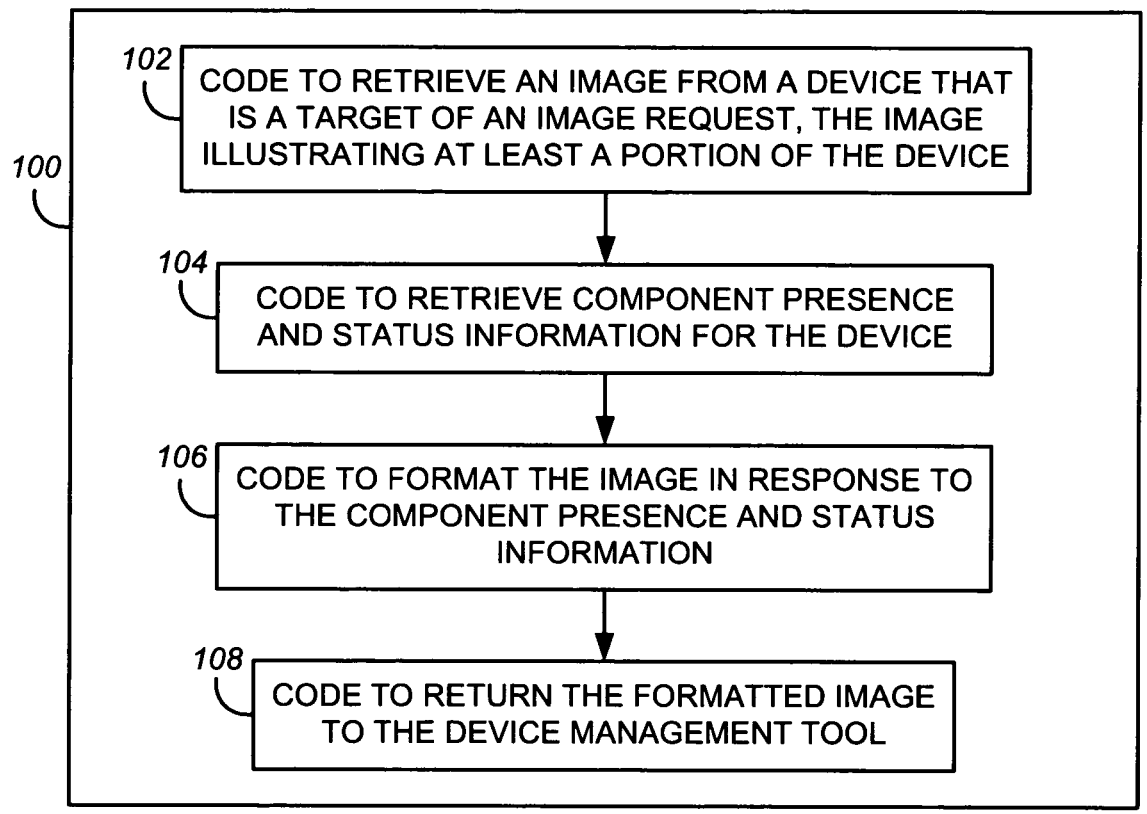
FIG. 1 illustrates a first exemplary embodiment of an image formatting utility.

FIG. 1 illustrates a first exemplary embodiment of an image formatting utility 100. The utility 100 comprises code 102, 104, 106, 108, stored and executed apart from any device that it retrieves images from, to, in response to receiving an image request from a device management tool: 1) retrieve an image from a device that is a target of the image request; 2) retrieve component presence and status information for the device; 3) format the image in response to the component presence and status information; and 4) return the formatted image to the device management tool. As explained in detail later in this Description, "formatting" a selected image may comprise updating the image's native format to reflect component presence and status information, as well as other information. In addition, if an image exists in an un-rendered format, such as a Scalable Vector Graphics (SVG) format, "formatting" may comprise rendering the image (i.e., converting the image to a raster-based format).

Figure 2:
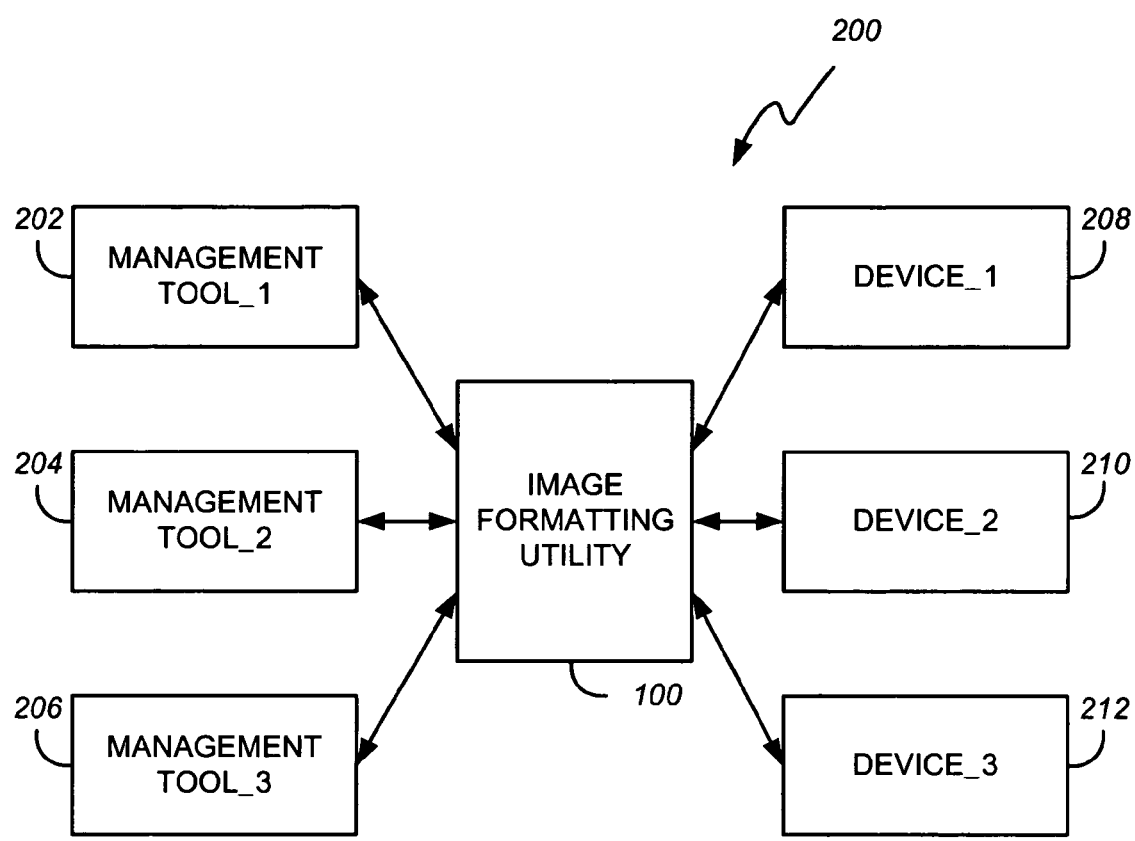
FIG. 2 illustrates an exemplary system in which the image formatting utility shown in FIG. 1 may be used.

FIG. 2 illustrates an exemplary system 200 in which the image formatting utility 100 may be used. The system 200 comprises one or more device management tools 202, 204, 206 for generating image requests, and one or more devices 208, 210, 212 that may be targets of the image requests. Each of the devices 208-212 is provided with a non-volatile memory in which one or more images (i.e., an image set) illustrating the device is stored. Assuming that the management tools 202-206 and devices 208-212 comprise interfaces that are compatible with those of the image formatting utility 100, the utility 100 may 1) receive plural image requests from any one or more of the management tools 202-206, and 2) in responding to the plural image requests, format images retrieved from a plurality of the devices 208-212 and return the formatted images to the requesting ones of the management tools 202-206. Of note, the management tools 202-206 and devices 208-212 of the system 200 have no direct link to, nor dependence on, each other. Thus, one or the other can easily be modified or appended to without affecting the other. Furthermore, the image(s) stored within the devices 208-212 can be updated without any need to worry about how the updated images will be drawn by the utility 100 or the management tools 202-206.

The devices 208-212 of the system 200 may take various forms, including, for example, those of a: server, computer system, printer, or network. Further, the devices in which images are stored may be parts of other devices. For example, images may be stored in a memory of a computer motherboard, while additional images may be stored in a configurable video or networking card that has been inserted into a slot of the motherboard.

The management tools 202-206 of the system 200 may also take various forms, including, for example, those of a: print driver, configuration manager, licensing manager, server manager, system manager, or network manager. In one embodiment of the system 200, one or more of the device management tools 202-206 may present a user interface (e.g., a graphical user interface (GUI)) through a web browser.

Figure 3:
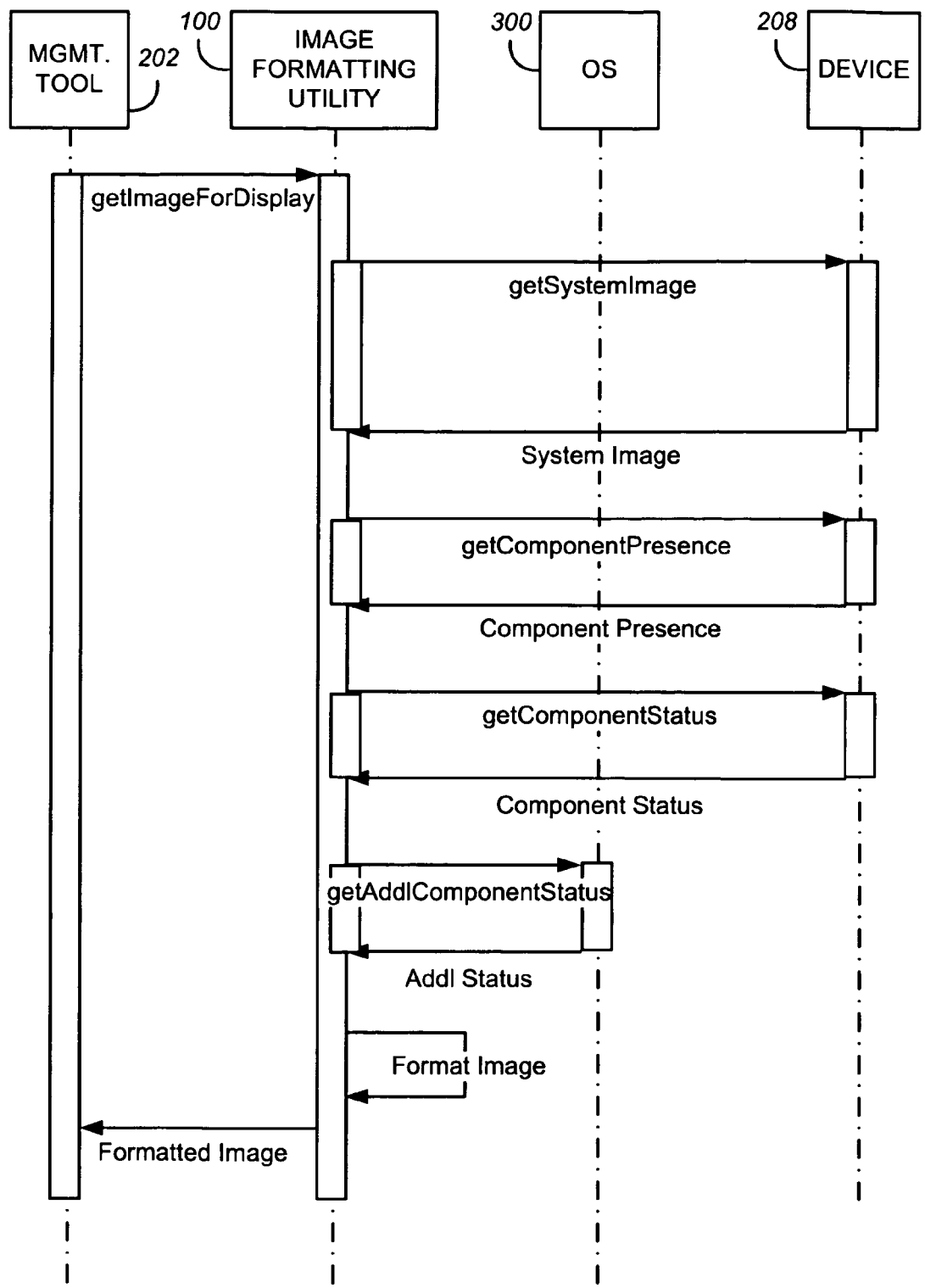
FIG. 3 illustrates an exemplary operation of the image formatting utility shown in FIGS. 1 & 2.

FIG. 3 illustrates an exemplary operation of the image formatting utility 100 shown in FIGS. 1 & 2. Upon receiving an image request (e.g., getImageForDisplay) from a device management tool 202, the utility 100 may issue a command (e.g., getSystemImage) for the purpose of retrieving an image from the device 208 that is the target of the image request. However, in some cases, the utility 100 may cache retrieved images and may first search its cache for a desired image.

In a simple embodiment, the interface of the device 208 need only have an ability to fetch and return its stored image set (possibly only one image). However, in other embodiments, the device's interface may have an ability to fetch a particular image (e.g., via address, number or type). The device's interface may also return component presence and status information for the device 208, although it need not.

Preferably, a device's image set comprises one or more SVG images, each of which illustrate at least a portion of the device. SVG is a language for describing two-dimensional graphics and graphical applications in extensible markup language (XML). SVG specifications are published by the World Wide Web Consortium (W3C®). SVG images can be advantageous as a result of their small storage requirements, scalable size, and configurability. Alternately, a device's image set may comprise other types of easy-to-manipulate images, such as other vector-based images (e.g., postscript images).

Upon receiving an image set from the device 208, the utility 100 may issue one or more commands (e.g., getComponentPresence and getComponentStatus) to retrieve component presence and status information from the device 208 (e.g., from firmware of the device). The presence information indicates whether upgradeable or configurable components are present in or on the device. The status information may be as simple as positive/negative indications of whether components are functioning as desired, or may comprise additional information regarding the quality or consistency of a component's performance.

In some cases, the utility 100 may retrieve additional status information for the device 208 from an operating system 300 that interfaces with the device 208 (e.g., via the command getAddlComponentStatus). Additional status information may also be retrieved from one or more management tools 204, 206 of which the utility 100 is aware. However, in one embodiment, the utility 100 is designed such that it can function without any specific knowledge of the management tools 202-206 and devices 208-212 with which it interfaces.

Upon (and sometimes before) receiving presence and status information for a device 208, the utility 100 proceeds to format a selected image or images of the image set (Format Image, FIG. 3) in response to 1) a received image request, and 2) component presence and status information that the utility 100 acquires while processing the image request.

In one embodiment, the utility 100 uses component presence information to enable or disable parts of an image that define particular components of a device, thereby dictating which parts of the image will be displayed. For example, if the image is an SVG image, the image may comprise sets of vectors that define a base device as well as the placement, size and orientation of components that can be installed on the base device (e.g., an image may define a motherboard, as well as processors and memory cards that may be installed on the motherboard). Each of the component vector sets in the SVG image may be associated with an identifying "tag". In this manner, an SVG image may be formatted in response to component presence information by 1) searching for tags corresponding to various components, and 2) editing the tags to indicate whether their associated vector sets should be made "visible" (enabled) or "invisible" (disabled). Alternately, vector sets corresponding to absent components can be deleted, and all other vector sets can be made visible. Or, if image formatting is to include image rendering (i.e., conversion of the image to a raster-based format), component presence information may be used to simply determine what portions of an image will be rendered, without causing the native image file to be edited.

An image may also be formatted by using component status information. In some cases, component status information may be used to annotate handles or fields associated with configurable areas of an image (i.e., areas of an image that are provided for display of particular pieces of information). Thus, for example, information concerning the operation or failure of the device 208 or its components, as well as additional information regarding the quality or consistency of a component's performance, may be added to (e.g., placed or filled in on) an image. In some cases, handles indicating what or where part or all of an image is may be translated to user-identifiable labels.

Status information may also be used to highlight a specified portion (or portions) of an image. For example, components that are operating as intended may be highlighted green, while failed components may be highlighted red. Alternately (or additionally), image highlighting may be performed in response to an image request. For example, if the image request asks to see a device's memory configuration, the installed memory modules on a device's motherboard may be highlighted.

If the image retrieved from a device is an SVG or other easy-to-manipulate image, the above-described presence and status formatting may be undertaken by making simple changes to the image file. For example, the style of a particular component, or the fill (e.g., text fill) of a particular field, can be changed by simply changing the text of one or more lines of an SVG image file.

In the case of a rendered image, the image may also be formatted by correlating coordinates of the image with components of the device it represents (e.g., by correlating associations between i) portions of a rendered image, ii) the sets of vectors in a retrieved image file that are used to draw the portions of the rendered image, and iii) tags within the retrieved image file that identify the components that are associated with the sets of vectors).

If more than one image is available for retrieval from a device 208, the utility 100 may need to identify a particular image to format. Image identification/selection may be undertaken in a number of ways. For example, the utility 100 may scan the images for any indication of a default image, and then select the default image for formatting. In some cases, a device's images may be numbered or addressed such that an image corresponding to a particular number or address may be considered the device's default image. A device's images may also be linked in a tiered or tree form, such that one of its images may be clearly recognized by the utility 100 as a default image. The linking of images can also aid a management tool in being able to "drill down" through a set of images.

In lieu of selecting a default image, the utility 100 may be provided with code for identifying an image in response to parameters included in a received image request. For example, a management tool 202 may request an image that 1) depicts a best available view of a device 208, 2) depicts a best available view of a particular component or feature of the device 208 specified in an image request, or 3) depicts a best available view of a specified location of the device 208 (e.g., its exterior, interior, memory bank, or processor core) specified in an image request. The utility 100 may then filter the images based on various handles that it can locate for the images, such as indications of "what" or "where" the image is in the context of the device 208.

After formatting an image, the utility 100 returns the formatted image to the device management tool 202 that requested the image. See FIG. 3. In some cases, the utility 100 may return only a single formatted image (in the form of a single SVG image, or in some rendered form, such as a JPEG or GIF image). In other cases, the utility may return not only a formatted image, but also such items as handle coordinates, an SVG coordinate-to-handle map, or an image-to-physical coordinate map.

What is claimed is:

1. A system for displaying images of a device, comprising:
   a device comprising non-volatile memory in which an image illustrating at least a portion of the device is stored;
   a device management tool;
   an image formatting utility stored on a computer readable media, comprising code, stored and executed apart from any device that it retrieves images from, to, in response to receiving an image request from a device management tool, wherein said device management tool and said device have no dependence on and no direct link to each other,
   retrieve said image from said device that is a target of the image request, the image illustrating at least a portion of the device;
   retrieve component presence and status information for the device;
   format the image in response to the component presence and status information; and
   return the formatted image to the device management tool.

2. The system of claim 1, wherein the code formats the image in response to the component presence information by enabling display of a part of the image, the part of the image defining a particular component of the device.

3. The system of claim 2, wherein the part of the image is defined by a set of vectors in the image.

4. The system of claim 1, wherein the code formats the image in response to the component presence information by disabling display of a part of the image, the part of the image defining a particular component of the device.

5. The system of claim 4, wherein the part of the image is defined by a set of vectors in the image.

6. The system of claim 1, wherein the code retrieves at least part of the status information from firmware of the device.

7. The system of claim 1, wherein the code retrieves at least part of the status information from an operating system that interfaces with the device.

8. The system of claim 1, wherein the image is a Scalable Vector Graphics (SVG) image.

9. The system of claim 1, further comprising code to identify the retrieved image within an image set stored in the device, the retrieved image being identified as a result of its being a default image of an image set stored within the device.

10. The system of claim 1, further comprising code to identify the retrieved image within an image set stored in the device, the retrieved image being identified as a result of its being an image that depicts a best available view of the device.

11. The system of claim 1, further comprising code to identify the retrieved image within an image set stored in the device, the retrieved image being identified as a result of its being an image that depicts a best available view of a component specified in the image request.

12. The system of claim 1, further comprising code to identify the retrieved image within an image set stored in the device, the retrieved image being identified as a result of its being an image that depicts a best available view of a device location specified in the image request.

13. The system of claim 1, wherein the code further formats the retrieved image by, in response to the image request, highlighting a specified portion of the retrieved image.

14. The system of claim 1, further comprising code to translate handles of the retrieved image to user-identifiable labels.

15. The system of claim 1, wherein the code further formats the retrieved image by annotating handles associated with configurable areas of the image, the handles being annotated using the retrieved status information.

16. The system of claim 1, wherein the code is responsive to plural image requests received from a plurality of device management tools and, in responding to the plural image requests, the code formats images retrieved from a plurality of target devices and returns the formatted images to requesting ones of the device management tools.

17. A system for displaying images of a device, comprising:
   a device having a non-volatile memory in which an image illustrating at least a portion of the device is stored;
   a device management tool, wherein said device management tool and said device have no dependence on and no direct link to each other; and
   an image formatting utility stored on a computer readable media, comprising code, stored and executed apart from the device, to, in response to receiving an image request from the device management tool, retrieve the image from the device;
retrieve component presence and status information for the device;
format the image in response to the component presence and status information; and
return the formatted image to the device management tool.

18. The system of claim 17, wherein the device management tool presents a user interface through a web browser.

19. The system of claim 17, wherein the image is a Scalable Vector Graphics (SVG) image.

* * * * *